United States Patent
Abe et al.

(10) Patent No.: US 12,505,574 B2
(45) Date of Patent: Dec. 23, 2025

(54) IMAGING CONDITION DETERMINATION METHOD, IMAGING CONDITION DETERMINATION SYSTEM, IMAGING CONDITION DETERMINATION DEVICE, AND COMPUTER READABLE MEDIUM

(71) Applicant: NEC Corporation, Tokyo (JP)

(72) Inventors: Jiro Abe, Tokyo (JP); Yoshimasa Ono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 120 days.

(21) Appl. No.: 18/289,913

(22) PCT Filed: May 17, 2021

(86) PCT No.: PCT/JP2021/018636
§ 371 (c)(1),
(2) Date: Nov. 8, 2023

(87) PCT Pub. No.: WO2022/239170
PCT Pub. Date: Nov. 17, 2022

(65) Prior Publication Data
US 2024/0249433 A1 Jul. 25, 2024

(51) Int. Cl.
*G06T 7/73* (2017.01)
*G01S 17/86* (2020.01)
*G01S 17/89* (2020.01)

(52) U.S. Cl.
CPC ............... *G06T 7/74* (2017.01); *G01S 17/86* (2020.01); *G01S 17/89* (2013.01); *G06T 2207/10028* (2013.01); *G06T 2207/30244* (2013.01)

(58) Field of Classification Search
CPC ............. G06T 7/74; G06T 2207/10028; G06T 2207/30244; G01S 17/86; G01S 17/89; G01S 7/497; G01S 17/931; G01B 11/00
See application file for complete search history.

(56) References Cited

U.S. PATENT DOCUMENTS

| 2018/0232947 A1* | 8/2018 | Nehmadi | G01S 7/295 |
| 2020/0210726 A1* | 7/2020 | Yang | G06V 10/70 |

(Continued)

FOREIGN PATENT DOCUMENTS

| JP | 2006-242943 A | 9/2006 |
| JP | 2010-175423 A | 8/2010 |

(Continued)

OTHER PUBLICATIONS

Text 2019212811 (Year: 2019).*
International Search Report for PCT Application No. PCT/JP2021/018636, mailed on Jun. 29, 2021.

*Primary Examiner* — Fernando Alcon (57) ABSTRACT

An imaging condition determination system according to the present disclosure includes: a reference data holding unit (101) configured to hold reference data representing a position of an object; an indication object holding unit (102) configured to hold an indication object representing a position of a target object on the reference data; an imaging condition determination unit (103) configured to determine an imaging condition of LiDAR for imaging the target object based on the reference data and the indication object; and an imaging condition output unit (104) configured to output the imaging condition.

12 Claims, 7 Drawing Sheets

(56) References Cited

U.S. PATENT DOCUMENTS

| | | | |
|---|---|---|---|
| 2021/0034884 A1* | 2/2021 | Tsurumi | G06V 10/774 |
| 2021/0279908 A1* | 9/2021 | Nakashima | G06T 7/74 |
| 2022/0129685 A1* | 4/2022 | Gummadi | G06T 7/194 |
| 2022/0301192 A1* | 9/2022 | Boardman | G06T 7/579 |
| 2023/0281844 A1* | 9/2023 | Ezra | G06T 7/60 |
| | | | 382/106 |

FOREIGN PATENT DOCUMENTS

| | | | |
|---|---|---|---|
| JP | 2010-540933 A | 12/2010 | |
| JP | 2011-180022 A | 9/2011 | |
| JP | 2016-217941 A | 12/2016 | |
| JP | 2017-032280 A | 2/2017 | |
| JP | 2019-078746 A | 5/2019 | |
| JP | 2019-100856 A | 6/2019 | |
| JP | 2020-193820 A | 12/2020 | |
| WO | 2013/111229 A1 | 8/2013 | |
| WO | WO-2019212811 A1 * | 11/2019 | G05D 1/0212 |
| WO | WO-2020126123 A2 * | 6/2020 | G01S 17/42 |

* cited by examiner

IMAGING CONDITION DETERMINATION METHOD, IMAGING CONDITION DETERMINATION SYSTEM, IMAGING CONDITION DETERMINATION DEVICE, AND COMPUTER READABLE MEDIUM

This application is a National Stage Entry of PCT/JP2021/018636 filed on May 17, 2021, the contents of all of which are incorporated herein by reference, in their entirety.

TECHNICAL FIELD

The present disclosure relates to an imaging condition determination method, an imaging condition determination system, an imaging condition determination device, and a computer readable medium.

BACKGROUND ART

Light Detection And Ranging (LiDAR) is a technology capable of measuring a shape of a target object by imaging an imaging site and measuring a distance to the target object present at the imaging site. An example of a method of measuring the distance to the target object by the LiDAR includes a time of flight (ToF) method. Since the LiDAR can measure the shape of a target object over a wide range, the LiDAR is used for inspection of facilities and the like.

Specifically, the LiDAR measures the distance to the target object and the shape of the target object by radiating light to the target object present at the imaging site at the time of imaging the imaging site. At this time, the LiDAR acquires point cloud data that is a set of three-dimensional coordinates of measurement points on the target object measured by the LiDAR.

As a related technology for inspecting a facility by using the point cloud data, for example, a technology disclosed in Patent Literature 1 can be cited. In the technology disclosed in Patent Literature 1, point cloud data is used to detect a change portion changed among portions in the facility. Specifically, first, sparse point cloud data is acquired by a three-dimensional measurement device such as a laser scanner. Next, the three-dimensional detailed data stored in advance and the acquired sparse point cloud data are aligned. Next, a space where the sparse point cloud data is present in a target space region is set as a determination target space, and a difference amount between the three-dimensional detailed data and the sparse point cloud data in the determination target space is calculated. Next, the change portion changed from the three-dimensional detailed data is detected based on the calculation result of the difference amount. Thereafter, the acquisition of the sparse point cloud data and the detection of the change portion are performed in the same manner as described above by moving the three-dimensional measurement device in the determination target space.

CITATION LIST

Patent Literature

Patent Literature 1: Japanese Unexamined Patent Application Publication No. 2016-217941

SUMMARY OF INVENTION

Technical Problem

Meanwhile, the point cloud data acquired by the LiDAR includes not only the data of the three-dimensional coordinates of the measurement point on the target object but also data of reflection luminance of the measurement point (intensity of reflected light at the measurement point). However, the point cloud data acquired by the LiDAR depends on imaging conditions of the LiDAR (for example, an imaging position, an imaging posture, and the like).

For example, the data of the reflection luminance included in the point cloud data acquired by the LiDAR depends on a positional relationship (for example, a distance, an incident angle, and the like) between the LiDAR and the target object.

Furthermore, the range in which the LiDAR can acquire the point cloud data depends on the positional relationship between the LiDAR and a shielding object due to the linearity of light.

Furthermore, the content included in a constant angle of view of the point cloud data acquired by the LiDAR depends on the imaging position and imaging posture of the LiDAR.

Therefore, in order to appropriately image the target object by the LiDAR, it is necessary to determine an appropriate imaging condition of the LiDAR.

However, the technology disclosed in Patent Literature 1 is a technology of moving the three-dimensional measurement device in the determination target space in order to detect a change portion in the facility. Therefore, Patent Literature 1 does not disclose any determination method for an appropriate imaging condition for appropriately imaging a target object.

Then, an object of the present disclosure is to solve the above-described problems and provide an imaging condition determination method, an imaging condition determination system, an imaging condition determination device, and a computer readable medium, in which an appropriate imaging condition of the LiDAR can be determined.

Solution to Problem

According to an aspect of the present disclosure, there is provided an imaging condition determination method performed by an imaging condition determination device, the method including:
  a first step of holding reference data representing a position of an object;
  a second step of holding an indication object representing a position of a target object on the reference data;
  a third step of determining an imaging condition of Light Detection And Ranging (LiDAR) for imaging the target object based on the reference data and the indication object; and
  a fourth step of outputting the imaging condition.

According to another aspect of the present disclosure, there is provided an imaging condition determination system including:
  a reference data holding unit configured to hold reference data representing a position of an object;
  an indication object holding unit configured to hold an indication object representing a position of a target object on the reference data;
  an imaging condition determination unit configured to determine an imaging condition of Light Detection And Ranging (LiDAR) for imaging the target object based on the reference data and the indication object; and
  an imaging condition output unit configured to output the imaging condition.

According to still another aspect of the present disclosure, there is provided an imaging condition determination device including:

a reference data holding unit configured to hold reference data representing a position of an object;

an indication object holding unit configured to hold an indication object representing a position of a target object on the reference data;

an imaging condition determination unit configured to determine an imaging condition of Light Detection And Ranging (LiDAR) for imaging the target object based on the reference data and the indication object; and an imaging condition output unit configured to output the imaging condition.

According to still another aspect of the present disclosure, there is provided a computer readable medium storing a program, the program causing a computer to execute:

a first procedure of holding reference data representing a position of an object;

a second procedure of holding an indication object representing a position of a target object on the reference data;

a third procedure of determining an imaging condition of Light Detection And Ranging (LiDAR) for imaging the target object based on the reference data and the indication object; and a fourth procedure of outputting the imaging condition.

Advantageous Effects of Invention

According to the aspects of the present disclosure, it is possible to provide an imaging condition determination method, an imaging condition determination system, an imaging condition determination device, and a computer readable medium, in which an appropriate imaging condition of the LiDAR can be determined.

EXAMPLE EMBODIMENT

Example embodiments of the present disclosure are described below with reference to the drawings. Note that in the description and drawings to be described below, omission and simplification are made as appropriate, for clarity of description. Furthermore, in each of the drawings to be described below, the same elements are denoted by the same reference signs, and an overlapping description will be omitted as necessary.

First Example Embodiment

First, a configuration example of an imaging condition determination system 100 according to a first example embodiment will be described with reference to FIG. 1.

Figure 1:
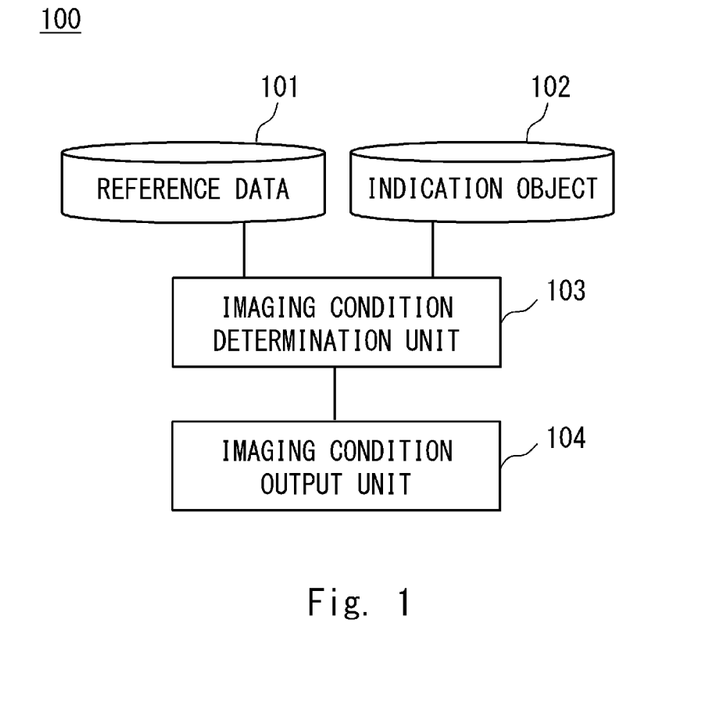
FIG. 1 is a diagram illustrating a configuration example of an imaging condition determination system according to a first example embodiment.

As illustrated in FIG. 1, the imaging condition determination system 100 according to the first example embodiment includes a reference data holding unit 101, an indication object holding unit 102, an imaging condition determination unit 103, and an imaging condition output unit 104, and is a system for determining an appropriate imaging condition of LiDAR (not illustrated).

The reference data holding unit 101 holds reference data.

The reference data is data representing a position of an object at an imaging site. For example, the reference data is point cloud data acquired by the LiDAR described above, image data acquired by a camera (not illustrated), a design drawing, or the like.

The indication object holding unit 102 holds an indication object.

The indication object is information representing the position of the target object to be imaged by the LiDAR on the reference data. For example, the indication object is a point included in a target object on the reference data, a region having a common region with the target object on the reference data, or the like.

Furthermore, the indication object can be indicated by a user. However, in a case where the target object represents a unique property on the reference data, the indication object can be determined not by user indication but by automatic processing. For example, the indication object holding unit 102 may hold in advance a setting condition for setting a portion having a color or a shape feature (curvature) within a predetermined range as an indication object. Then, the indication object holding unit 102 may search for a portion defined in the setting condition in a portion on the reference data, and determine and hold the found portion as the indication object. Alternatively, the indication object holding unit 102 may hold in advance a setting condition for setting a certain object as an indication object. Then, the indication object holding unit 102 may search for an object defined in the setting condition among objects on the reference data by using an object search technology such as pattern matching, and determine and hold the found object as the indication object.

The imaging condition determination unit 103 determines an imaging condition of LiDAR for imaging a target object represented by the indication object based on the reference data and the indication object.

The imaging condition is a condition under which the LiDAR images a target object. For example, the imaging condition includes an imaging position, an imaging posture, an imaging angle of view, and an imaging resolution.

Note that a specific example of a determination method for the imaging condition by the imaging condition determination unit 103 will be described later.

The imaging condition output unit 104 outputs the imaging condition determined by the imaging condition determination unit 103 to the user or an external means.

An output method for the imaging condition is not particularly limited, but any method is suitable as long as the method assists efficient LiDAR imaging by the user or the external means.

For example, the imaging condition output unit 104 may highlight and display a part of the reference data based on the imaging condition. For example, when the imaging condition is the imaging position, the imaging condition output unit 104 may highlight and display the position corresponding to the imaging position on the reference data by marking or the like.

Alternatively, the imaging condition output unit 104 may display an image diagram at the time of performing the imaging based on the imaging condition on the reference data.

Alternatively, the imaging condition output unit 104 may display the imaging result estimated from the imaging condition on a screen.

Here, a specific example of a determination method for the imaging condition by the imaging condition determination unit 103 according to the first example embodiment will be described. An example to be described below is an example of determining the imaging position and the imaging posture as the imaging condition.

(A1) Determination Method A1

First, a determination method A1 for the imaging condition by the imaging condition determination unit 103 according to the first example embodiment will be described with reference to FIG. 2. Note that FIG. 2 is a plan view of the imaging site as viewed from above (the same applies to FIG. 3 to be described later).

Figure 2:
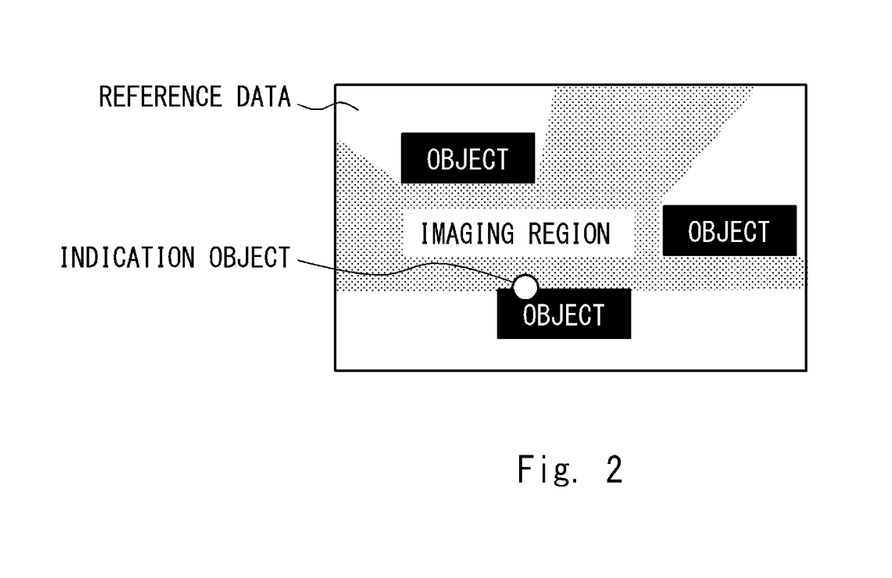
FIG. 2 is a diagram illustrating an example of a determination method A1 for an imaging condition by an imaging condition determination unit according to the first example embodiment.

As illustrated in FIG. 2, in the determination method A1, first, the imaging condition determination unit 103 calculates an imaging region in which the target object represented by the indication object can be imaged. The imaging region in which the target object can be imaged is a region in which the target object is not shielded by the object, and is a region that can be physically imaged. For example, in a case where the imaging is not possible in a state in which the LiDAR is installed on the object, an area excluding the upper portion of the object is a physically imageable region.

Next, the imaging condition determination unit 103 determines the imaging position from the calculated imaging region.

Thereafter, the imaging condition determination unit 103 determines the imaging posture based on a direction vector from the determined imaging position to the indication object.

(A2) Determination Method A2

Next, a determination method A2 for the imaging condition by the imaging condition determination unit 103 according to the first example embodiment will be described with reference to FIG. 3.

Figure 3:
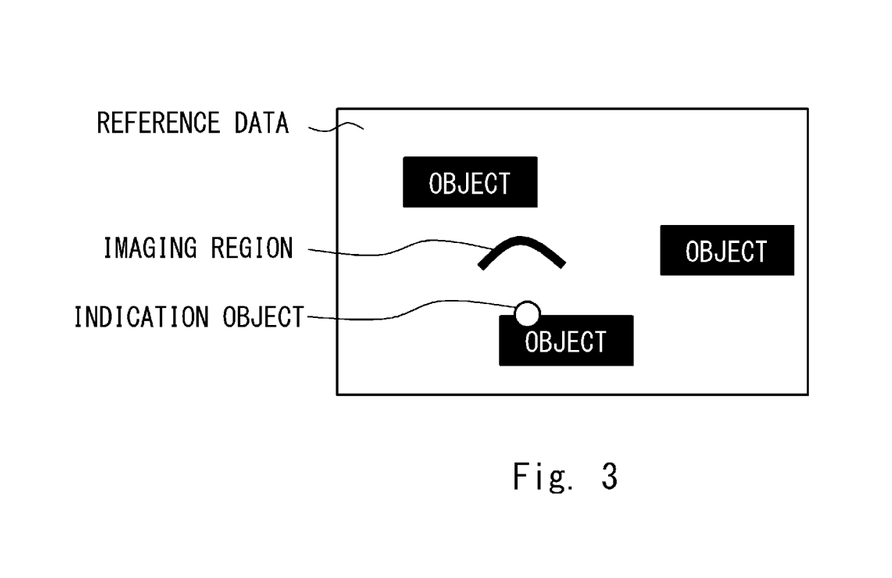
FIG. 3 is a diagram illustrating an example of a determination method A2 for an imaging condition by an imaging condition determination unit according to the first example embodiment.

As illustrated in FIG. 3, in the determination method A2, first, the imaging condition determination unit 103 calculates an appropriate imaging region based on a distance to the indication object or an incident angle.

Thereafter, the imaging condition determination unit 103 determines the imaging position and the imaging posture similarly to the above-described determination method A1.

That is, the imaging condition determination unit 103 determines the imaging position in the calculated imaging region, and determines the imaging posture based on a direction vector from the determined imaging position to the indication object.

Next, an example of an entire operation flow of the imaging condition determination system 100 according to the first example embodiment will be described with reference to FIG. 4.

Figure 4:
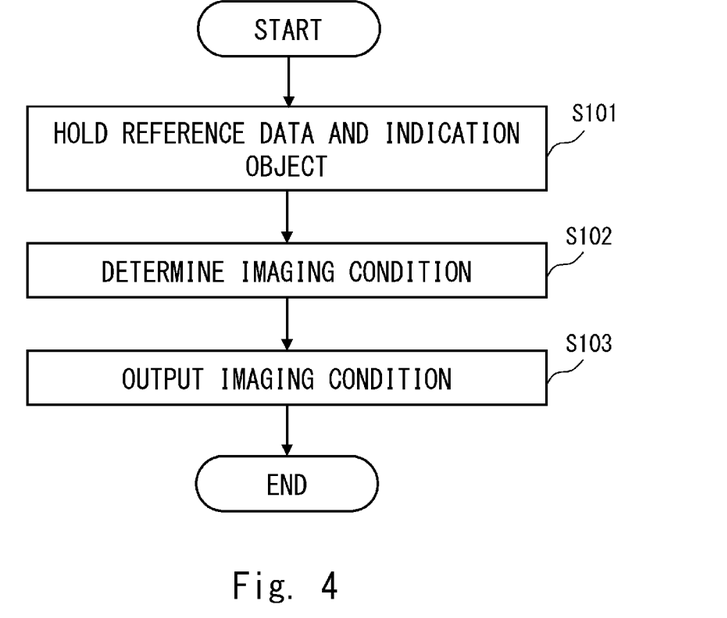
FIG. 4 is a flowchart illustrating an example of an entire operation flow of an imaging condition determination system according to the first example embodiment.

As illustrated in FIG. 4, first, the reference data holding unit 101 holds the reference data, and the indication object holding unit 102 holds the indication object (step S101). At this time, the reference data holding unit 101 holds the reference data specified by the user. On the other hand, the indication object holding unit 102 holds the indication object specified by the user or holds the indication object determined by automatic processing.

Next, the imaging condition determination unit 103 determines an imaging condition of LiDAR for imaging a target object represented by the indication object based on the reference data and the indication object (step S102).

Thereafter, the imaging condition output unit 104 outputs the imaging condition determined by the imaging condition determination unit 103 to the user or the external means (step S103).

As described above, according to the first example embodiment, the reference data holding unit 101 holds the reference data representing the position of the object, and the indication object holding unit 102 holds the indication object representing the position of the target object on the reference data. Furthermore, the imaging condition determination unit 103 determines an imaging condition of the LiDAR for imaging the target object represented by the indication object based on the reference data and the indication object, and the imaging condition output unit 104 outputs the determined imaging condition. Therefore, an appropriate imaging condition of the LiDAR can be determined.

Second Example Embodiment

Next, a configuration example of an imaging condition determination system 100A according to a second example embodiment will be described with reference to FIG. 5.

Figure 5:
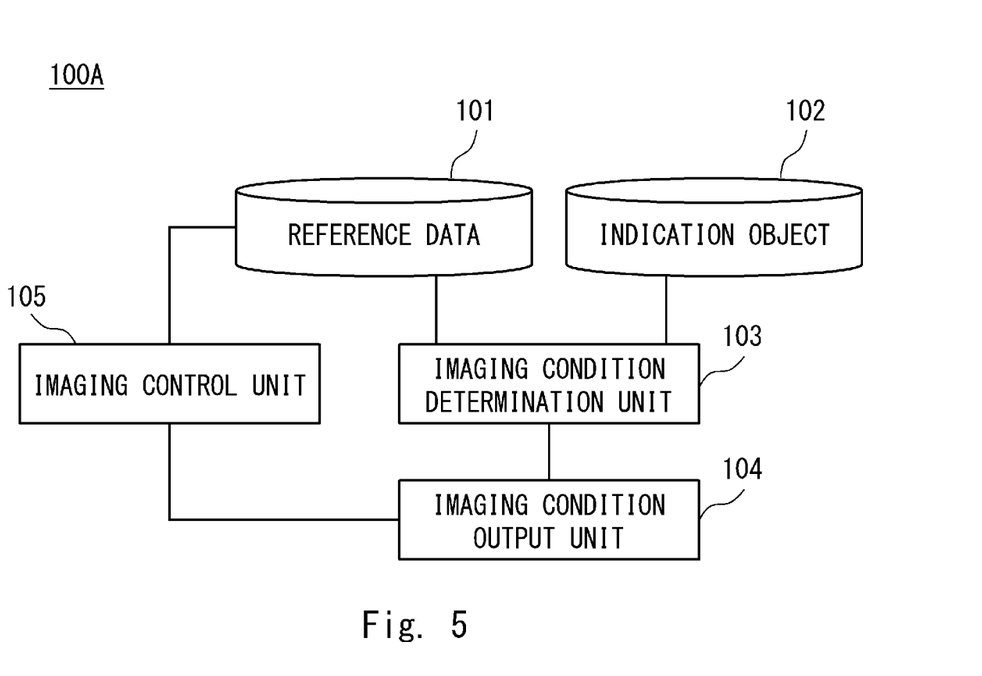
FIG. 5 is a diagram illustrating a configuration example of an imaging condition determination system according to a second example embodiment.

As illustrated in FIG. 5, the imaging condition determination system 100A according to the second example embodiment is different from the configuration of the first example embodiment in that an imaging control unit 105 is added.

The imaging control unit 105 is disposed at the imaging site together with an imaging device (not illustrated), and acquires the reference data by using the imaging device at the imaging site. The imaging device is a device including only the LiDAR or including the LiDAR and the camera, or an autonomous mobile robot equipped with the device. Therefore, in the second example embodiment, the reference data is data acquired by the imaging device, and as a result, the design drawing and the like are excluded.

The imaging condition determination unit 103 determines the imaging condition of the LiDAR as in the first example embodiment. Here, determining the imaging condition of the LiDAR means determining the imaging condition of the imaging device. Therefore, in the following description, it is assumed that the imaging condition determination unit 103 determines the imaging condition of the imaging device.

The imaging condition output unit 104 outputs the imaging condition to the imaging control unit 105 by communication with the imaging control unit 105. In this case, the imaging condition may be a route from the current position to the imaging position, which acts on the imaging device. Alternatively, the imaging condition may be displacement (elevation angle and azimuth angle) from the current posture to the imaging posture, which acts on the imaging device.

The imaging control unit 105 changes the state of the imaging device, that is, the state of the LiDAR based on the imaging condition output from the imaging condition output unit 104. For example, in a case where the imaging device further includes a camera, the state of the camera is also changed as the state of the imaging device is changed.

Here, a specific example of a determination method for the imaging condition by the imaging condition determination unit 103 according to the second example embodiment will be described.

(B1) Determination Method B1

First, a determination method B1 for the imaging condition by the imaging condition determination unit 103 according to the second example embodiment will be described with reference to FIG. 6. The determination method B1 is an example of determining the displacement from the current posture to the imaging posture as the imaging condition. Note that the determination method B1 is assumed that the imaging position is fixed.

Figure 6:
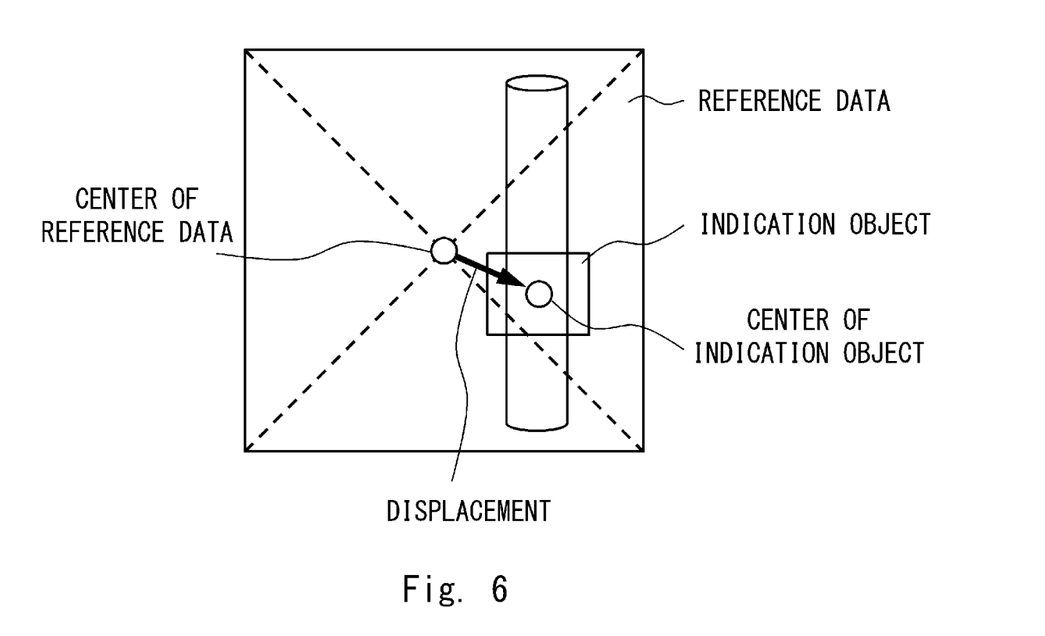
FIG. 6 is a diagram illustrating an example of a determination method B1 for an imaging condition by an imaging condition determination unit according to the second example embodiment.

As illustrated in FIG. 6, in the determination method B1, the imaging condition determination unit 103 determines the displacement of the imaging posture such that the indication object on the reference data is changed to a specific position (for example, the center) by changing the imaging posture.

In the example of FIG. 6, the imaging condition determination unit 103 calculates a direction vector from the center of the reference data to the center of the indication object, and determines the displacement (elevation angle and azimuth angle) of the imaging posture, which acts on the imaging device, based on the calculated direction vector.

(B2) Determination Method B2

Next, a determination method B2 for the imaging condition by the imaging condition determination unit 103 according to the second example embodiment will be described with reference to FIG. 7. The determination method B2 is an example of determining a route from the current position to the imaging position as the imaging condition. Note that FIG. 7 is a plan view of the imaging site as viewed from above.

Figure 7:
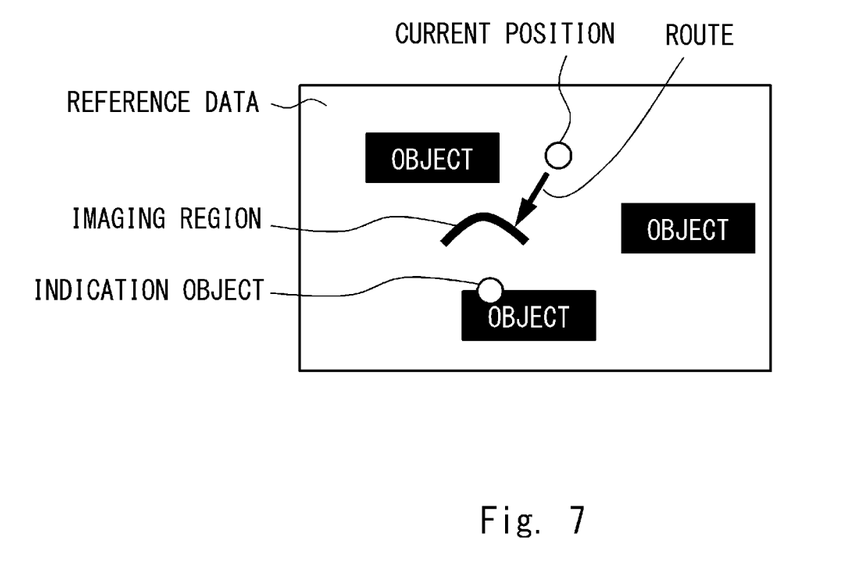
FIG. 7 is a diagram illustrating an example of a determination method B2 for an imaging condition by an imaging condition determination unit according to the second example embodiment.

As illustrated in FIG. 7, in the determination method B1, first, the imaging condition determination unit 103 calculates an appropriate imaging region by a method similar to the determination method A2 (FIG. 3) of the first example embodiment.

Next, the imaging condition determination unit 103 specifies the current position of the imaging device on the reference data.

Next, the imaging condition determination unit 103 determines the imaging position in the calculated imaging region based on the positional relationship (for example, the route length to arrival) with the current position of the imaging device.

Thereafter, the imaging condition determination unit 103 determines a route from the current position to the determined imaging position. Furthermore, the imaging condition determination unit 103 may determine the imaging posture by a method similar to the determination method A2 (FIG. 3) of the first example embodiment.

Note that in FIG. 7, when calculating the imaging region, the imaging condition determination unit 103 uses a method similar to the determination method A2 (FIG. 3) of the first example embodiment, but the method is not limited thereto. The imaging condition determination unit 103 may calculate the imaging region by a method similar to the determination method A1 (FIG. 2) of the first example embodiment.

(B3) Determination Method B3

Figure 9:
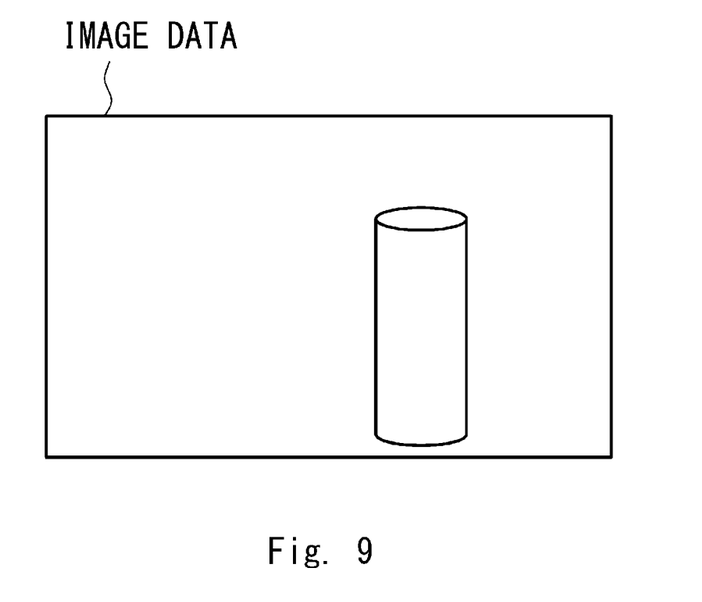
FIG. 9 is a diagram illustrating an example of image data of FIG. 8.
Figure 10:
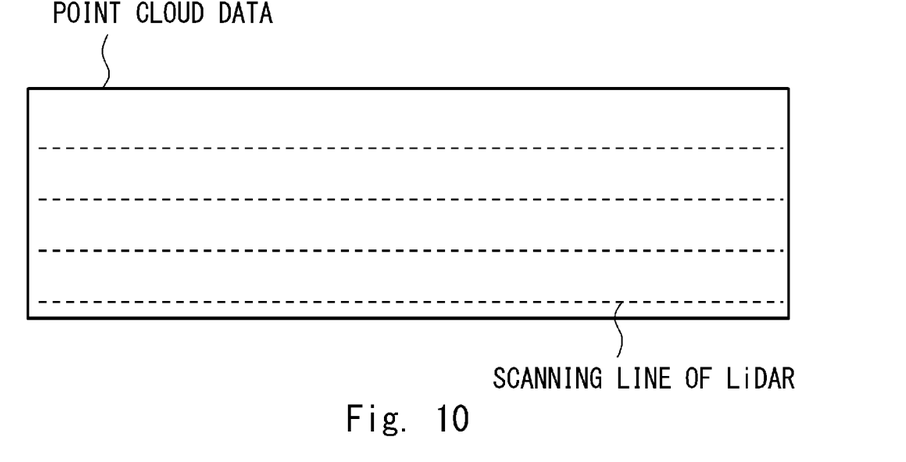
FIG. 10 is a diagram illustrating an example of point cloud data of FIG. 8.

Next, a determination method B3 for the imaging condition by the imaging condition determination unit 103 according to the second example embodiment will be described with reference to FIGS. 8 to 10.

Figure 8:
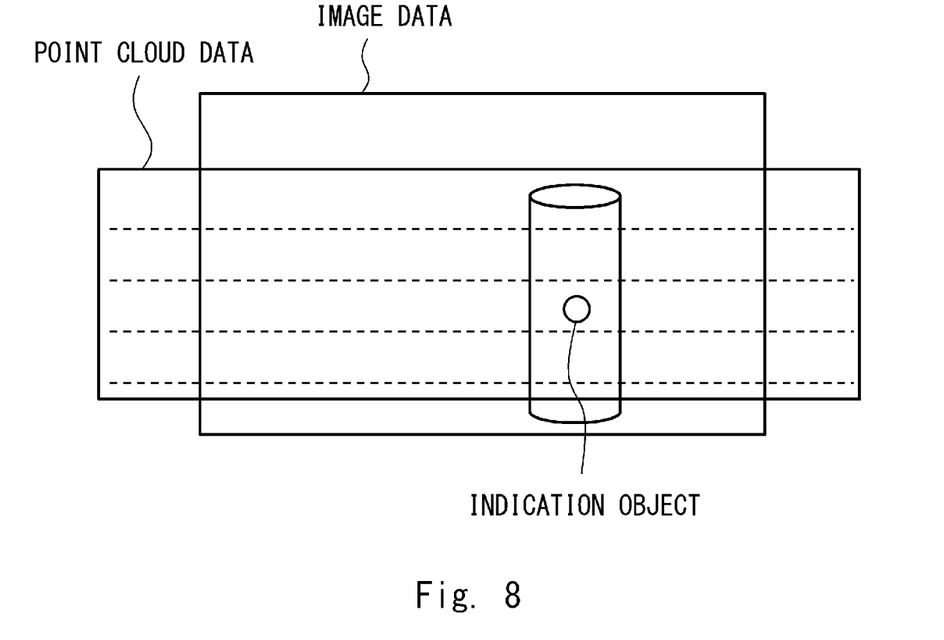
FIG. 8 is a diagram illustrating an example of a determination method B3 for an imaging condition by an imaging condition determination unit according to the second example embodiment.

As illustrated in FIG. 8, in the determination method B3, it is assumed that the reference data is data in which image data acquired by a camera (see FIG. 9) and point cloud data acquired by LiDAR (see FIG. 10) are superimposed. Therefore, in the determination method B3, it is assumed that the imaging device is also a device including both the LiDAR and the camera or an autonomous mobile robot equipped with the device.

In the example of FIG. 8, the indication object is not on the point cloud data but on the image data. In this case, for example, the imaging condition determination unit 103 determines the imaging posture by using the same method as the above-described determination method B1 (FIG. 6).

On the other hand, although not illustrated, it is assumed that the indication object is on any one point of the point cloud data. In this case, for example, the imaging condition determination unit 103 may determine the route from the current position to the imaging position and determine the imaging posture by using the same method as the above-described determination method B2 (FIG. 7).

However, even in a case where the indication object is not on the point cloud data but on the image data, the imaging condition determination unit 103 can determine the route from the current position to the imaging position and the imaging posture by using the following method. That is, the imaging condition determination unit 103 specifies an object including the indication object on the image data by clustering, and acquires a point representing the specified object on the point cloud data. Then, the imaging condition determination unit 103 regards the acquired point as the indication object, and determines the route and the imaging posture.

Furthermore, even in a case where the indication object is not on the point cloud data but on the image data, the point that can be regarded as the indication object can be acquired. Therefore, it is not always necessary to display the point cloud data. Therefore, even in a case where the reference data is data in which the image data and the point cloud data are superimposed, the imaging condition output unit 104 may display only the image data. Then, the imaging condition determination unit 103 may determine the position touched on the image data as the indication object and perform the above-described operation.

Next, an example of an entire operation flow of the imaging condition determination system 100A according to the second example embodiment will be described with reference to FIG. 11.

Figure 11:
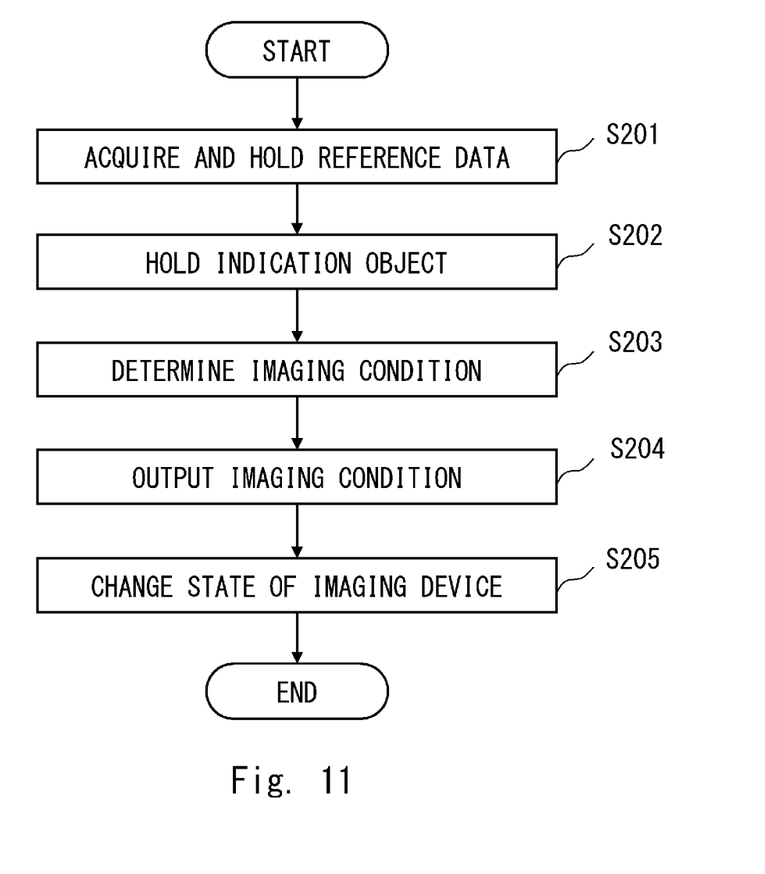
FIG. 11 is a flowchart illustrating an example of an entire operation flow of an imaging condition determination system according to the second example embodiment.

As illustrated in FIG. 11, first, the imaging control unit 105 acquires reference data by using the imaging device, and the reference data holding unit 101 holds the reference data acquired by the imaging control unit 105 (step S201). Furthermore, the indication object holding unit 102 holds an indication object (step S202). At this time, the indication object holding unit 102 holds the indication object specified by the user or holds the indication object determined by automatic processing.

Next, the imaging condition determination unit 103 determines an imaging condition of the imaging device for imaging a target object represented by the indication object based on the reference data and the indication object (step S203).

Next, the imaging condition output unit 104 outputs the imaging condition determined by the imaging condition determination unit 103 to the imaging control unit 105 (step S204).

Thereafter, the imaging control unit 105 changes the state of the imaging device based on the imaging condition output from the imaging condition output unit 104 (step S205).

As described above, according to the second example embodiment, the imaging condition output unit 104 outputs the imaging condition to the imaging control unit 105 that acquires the reference data by using the imaging device including at least the LiDAR. The imaging control unit 105 changes the state of the imaging device based on the imaging condition. As a result, for example, even when the imaging device is in a remote location, the state of the imaging device can be corrected. The other effects are similar to effects according to the first example embodiment described above.

Another Example Embodiment

In the first and second example embodiments described above, the reference data holding unit 101, the indication object holding unit 102, the imaging condition determination unit 103, and the imaging condition output unit 104 are illustrated as being separately provided, but these components may be collectively provided in one device (imaging condition determination device).

Next, a configuration example of an imaging condition determination device 200 according to another example embodiment will be described with reference to FIG. 12.

Figure 12:
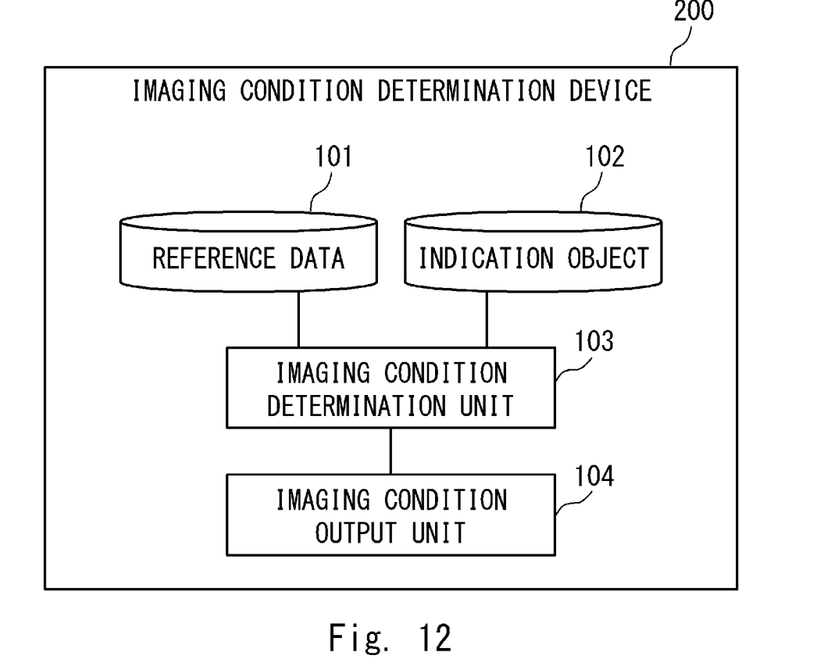
FIG. 12 is a diagram illustrating a configuration example of an imaging condition determination device according to another example embodiment.

As illustrated in FIG. 12, the imaging condition determination device 200 according to another example embodiment includes a reference data holding unit 101, an indication object holding unit 102, an imaging condition determination unit 103, and an imaging condition output unit 104. Note that the operation of these components is similar to the operation described in the first and second example embodiments, and thus the description thereof will be omitted.

<Hardware Configuration of Imaging Condition Determination Device According to Another Example Embodiment>

Next, a hardware configuration of a computer 300 that implements the imaging condition determination device 200 according to another example embodiment described above will be described with reference to FIG. 13.

Figure 13:
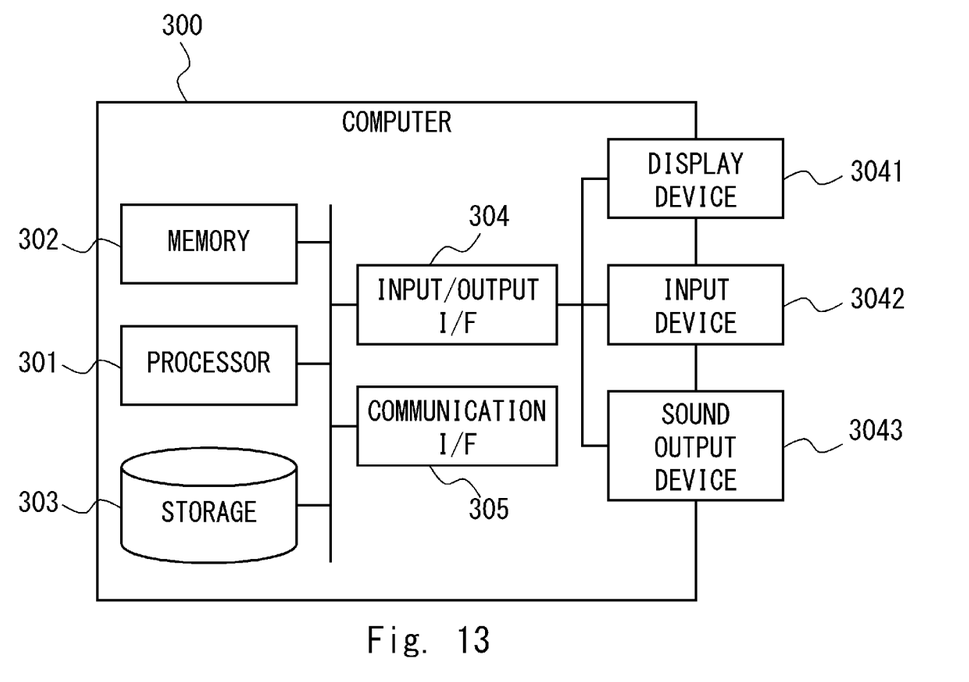
FIG. 13 is a block diagram illustrating a hardware configuration example of a computer that executes an imaging condition determination device according to another example embodiment.

As illustrated in FIG. 13, the computer 300 includes a processor 301, a memory 302, a storage 303, an input/output interface (input/output I/F) 304, and a communication interface (communication I/F) 305. The processor 301, the memory 302, the storage 303, the input/output interface 304, and the communication interface 305 are connected by a data transmission line for mutually transmitting or receiving data.

The processor 301 is an arithmetic processing device such as a central processing unit (CPU) or a graphics processing unit (GPU). The memory 302 is a memory such as a random access memory (RAM) or a read only memory (ROM). The storage 303 is a storage device such as a hard disk drive (HDD), a solid state drive (SSD), or a memory card. Furthermore, the storage 303 may be a memory such as a RAM or a ROM.

A program is stored in the storage 303. This program includes a group of commands (or software code) for causing a computer to perform one or more functions described in the example embodiments when being read by the computer. The imaging condition determination unit 103 and imaging condition output unit 104 in the imaging condition determination device 200 may be implemented by the processor 301 reading and executing the program stored in the storage 303. Furthermore, the reference data holding unit 101 and indication object holding unit 102 in the imaging condition determination device 200 may be implemented by the memory 302 or the storage 303.

Furthermore, the program may be stored in a non-transitory computer readable medium or a tangible storage medium. As an example and not by way of limitation, the computer readable medium or the tangible storage medium includes a RAM, a ROM, a flash memory, an SSD or other memory technology, a compact disc (CD)-ROM, a digital versatile disc (DVD), a Blu-ray (registered trademark) disk or other optical disk storage, a magnetic cassette, a magnetic tape, a magnetic disk storage, or other magnetic storage devices. The program may be transmitted on a transitory computer readable medium or a communication medium. As an example and not by way of limitation, the transitory computer readable medium or the communication medium includes an electrical signal, an optical signal, an acoustic signal, or other forms of propagation signals.

The input/output interface 304 is connected to a display device 3041, an input device 3042, a sound output device 3043, and the like. The display device 3041 is a device that displays a screen corresponding to drawing data processed by the processor 301, such as a liquid crystal display (LCD), a cathode ray tube (CRT) display, or a monitor. The input device 3042 is a device that receives an input of an operation of the operator, and is, for example, a keyboard, a mouse, a touch sensor, or the like. The display device 3041 and the input device 3042 may be integrated, and may be implemented as a touch panel. The sound output device 3043 is a device that acoustically outputs sound corresponding to acoustic data that has been processed by the processor 301, such as a speaker.

The communication interface 305 transmits or receives data to and from an external device. For example, the communication interface 305 performs communication with the external device via a wired communication line or a wireless communication line.

Although the present disclosure has been described with reference to the example embodiments, the present disclosure is not limited to the example embodiments described above. Various modifications that can be understood by those skilled in the art can be made to the configuration and details of the present disclosure within the scope of the present disclosure.

Furthermore, some or all of the above example embodiments may be described as the following supplementary notes but are not limited to the following.

(Supplementary Note 1)

An imaging condition determination method performed by an imaging condition determination device, the method including:
- a first step of holding reference data representing a position of an object;
- a second step of holding an indication object representing a position of a target object on the reference data;
- a third step of determining an imaging condition of Light Detection And Ranging (LiDAR) for imaging the target object based on the reference data and the indication object; and
- a fourth step of outputting the imaging condition.

(Supplementary Note 2)

The imaging condition determination method according to Supplementary note 1,
in which in the third step,
an imaging region is calculated, the imaging region being a region in which the target object is not shielded by the object and being capable of being physically imaged,
an imaging position is determined as the imaging condition in the imaging region, and
an imaging posture is determined as the imaging condition based on a direction vector from the imaging position to the indication object.

(Supplementary Note 3)

The imaging condition determination method according to Supplementary note 1,
in which in the third step,
an imaging region is calculated based on a distance to the indication object or an incident angle,
an imaging position is determined as the imaging condition in the imaging region, and
an imaging posture is determined as the imaging condition based on a direction vector from the imaging position to the indication object.

(Supplementary Note 4)

The imaging condition determination method according to Supplementary note 1,
in which in the fourth step,
the imaging condition is output to an imaging control unit that acquires the reference data by using an imaging device including only the LiDAR or including the LiDAR and a camera, and
the imaging control unit changes a state of the imaging device based on the imaging condition.

(Supplementary Note 5)

The imaging condition determination method according to Supplementary note 4,
in which in the third step,
a direction vector from a specific position of the reference data to a center of the indication object is calculated, and
a displacement from a current posture to an imaging posture of the imaging device is determined as the imaging condition based on the direction vector.

(Supplementary Note 6)

The imaging condition determination method according to Supplementary note 4,
in which in the third step,
an imaging region is calculated, the imaging region being a region in which the target object is not shielded by the object and being capable of being physically imaged, or the imaging region is calculated based on a distance to the indication object or an incident angle,
an imaging position is determined in the imaging region based on a positional relationship with a current position of the imaging device, and
a route from the current position to the imaging position of the imaging device is determined as the imaging condition.

(Supplementary Note 7)

The imaging condition determination method according to Supplementary note 6,
in which in the third step,
an imaging posture is determined as the imaging condition based on a direction vector from the imaging position to the indication object.

(Supplementary Note 8)

The imaging condition determination method according to Supplementary note 4,
in which the imaging device includes both the LiDAR and the camera,
the reference data is data in which point cloud data acquired by the LiDAR and image data acquired by the camera are superimposed, and
in the third step,
in a case where the indication object is not on the point cloud data but on the image data, a displacement from a current posture to an imaging posture of the imaging device is determined as the imaging condition, and
in a case where the indication object is on any one point of the point cloud data, a route from a current position to an imaging position of the imaging device and the imaging posture are determined as the imaging condition.

(Supplementary Note 9)

The imaging condition determination method according to Supplementary note 4,
in which the imaging device includes both the LiDAR and the camera,
the reference data is data in which point cloud data acquired by the LiDAR and image data acquired by the camera are superimposed, and
in the third step,
in a case where the indication object is not on the point cloud data but on the image data,
an object including the indication object on the image data is specified by clustering,
a point representing the specified object on the point cloud data is acquired,
the acquired point is regarded as the indication object, and
a route from a current position to an imaging position of the imaging device and an imaging posture are determined as the imaging condition.

(Supplementary Note 10)

The imaging condition determination method according to Supplementary note 8 or 9,
in which in the third step,
in a case where the displacement from the current posture to the imaging posture of the imaging device is determined as the imaging condition,
a direction vector from a specific position of the reference data to a center of the indication object is calculated, and
the displacement from the current posture to the imaging posture of the imaging device is determined based on the direction vector.

(Supplementary Note 11)

The imaging condition determination method according to Supplementary note 8 or 9, in which in the third step,
in a case where the route from the current position to the imaging position of the imaging device and the imaging posture are determined as the imaging condition,
an imaging region is calculated, the imaging region being a region in which the target object is not shielded by the object and being capable of being physically imaged, or the imaging region is calculated based on a distance to the indication object or an incident angle,
an imaging position is determined in the imaging region based on a positional relationship with the current position of the imaging device,
the route from the current position to the imaging position of the imaging device is determined, and
the imaging posture is determined based on a direction vector form the imaging position to the indication object.

(Supplementary Note 12)

An imaging condition determination system including:
a reference data holding unit configured to hold reference data representing a position of an object;
an indication object holding unit configured to hold an indication object representing a position of a target object on the reference data;
an imaging condition determination unit configured to determine an imaging condition of Light Detection And Ranging (LiDAR) for imaging the target object based on the reference data and the indication object; and
an imaging condition output unit configured to output the imaging condition.

(Supplementary Note 13)

The imaging condition determination system according to Supplementary note 12, further including an imaging control unit configured to acquire the reference data by using an imaging device including only the LiDAR or including the LiDAR and a camera,
in which the imaging condition output unit outputs the imaging condition to the imaging control unit, and
the imaging control unit changes a state of the imaging device based on the imaging condition.

(Supplementary Note 14)

An imaging condition determination device including:
a reference data holding unit configured to hold reference data representing a position of an object;
an indication object holding unit configured to hold an indication object representing a position of a target object on the reference data;
an imaging condition determination unit configured to determine an imaging condition of Light Detection And Ranging (LiDAR) for imaging the target object based on the reference data and the indication object; and
an imaging condition output unit configured to output the imaging condition.

(Supplementary Note 15)

The imaging condition determination device according to Supplementary note 14,
in which the imaging condition output unit outputs the imaging condition to an imaging control unit configured to acquire the reference data by using an imaging device including only the LiDAR or including the LiDAR and a camera, and
the imaging control unit changes a state of the imaging device based on the imaging condition.

(Supplementary Note 16)

A non-transitory computer readable medium storing a program, the program causing a computer to execute:
a first procedure of holding reference data representing a position of an object;
a second procedure of holding an indication object representing a position of a target object on the reference data;
a third procedure of determining an imaging condition of Light Detection And Ranging (LiDAR) for imaging the target object based on the reference data and the indication object; and
a fourth procedure of outputting the imaging condition.

REFERENCE SIGNS LIST 100, 100A Imaging Condition Determination System
101 Reference Data Holding Unit
102 Indication Object Holding Unit
103 Imaging Condition Determination Unit
104 Imaging Condition Output Unit
105 Imaging Control Unit
200 Imaging Condition Determination Device
300 Computer
301 Processor
302 Memory
303 Storage
304 Input/Output Interface
3041 Display Device
3042 Input Device
3043 Sound Output Device
305 Communication Interface

What is claimed is:

1. An imaging condition determination method performed by an imaging condition determination device, the method comprising:
a first step of holding reference data representing a position of an object;
a second step of holding an indication object representing a position of a target object on the reference data;
a third step of determining an imaging condition of Light Detection And Ranging (LiDAR) for imaging the target object based on the reference data and the indication object; and
a fourth step of outputting the imaging condition,
wherein in the fourth step,
the imaging condition is output to an imaging controller that acquires the reference data by using an imaging device including only the LiDAR or including the LiDAR and a camera, and
the imaging controller changes a state of the imaging device based on the imaging condition.

2. The imaging condition determination method according to claim 1,
wherein in the third step,
an imaging region is calculated, the imaging region being a region in which the target object is not shielded by the object and being capable of being physically imaged,
an imaging position is determined as the imaging condition in the imaging region, and
an imaging posture is determined as the imaging condition based on a direction vector from the imaging position to the indication object.

3. The imaging condition determination method according to claim 1,
wherein in the third step,
an imaging region is calculated based on a distance to the indication object or an incident angle, an imaging position is determined as the imaging condition in the imaging region, and an imaging posture is determined as the imaging condition based on a direction vector from the imaging position to the indication object.

4. The imaging condition determination method according to claim 1, wherein in the third step, a direction vector from a specific position of the reference data to a center of the indication object is calculated, and a displacement from a current posture to an imaging posture of the imaging device is determined as the imaging condition based on the direction vector.

5. The imaging condition determination method according to claim 1, wherein in the third step, an imaging region is calculated, the imaging region being a region in which the target object is not shielded by the object and being capable of being physically imaged, or the imaging region is calculated based on a distance to the indication object or an incident angle, an imaging position is determined in the imaging region based on a positional relationship with a current position of the imaging device, and a route from the current position to the imaging position of the imaging device is determined as the imaging condition.

6. The imaging condition determination method according to claim 5, wherein in the third step, an imaging posture is determined as the imaging condition based on a direction vector from the imaging position to the indication object.

7. The imaging condition determination method according to claim 1, wherein the imaging device includes both the LiDAR and the camera, the reference data is data in which point cloud data acquired by the LiDAR and image data acquired by the camera are superimposed, and in the third step, in a case where the indication object is not on the point cloud data but on the image data, a displacement from a current posture to an imaging posture of the imaging device is determined as the imaging condition, and in a case where the indication object is on any one point of the point cloud data, a route from a current position to an imaging position of the imaging device and the imaging posture are determined as the imaging condition.

8. The imaging condition determination method according to claim 1, wherein the imaging device includes both the LiDAR and the camera, the reference data is data in which point cloud data acquired by the LiDAR and image data acquired by the camera are superimposed, and in the third step, in a case where the indication object is not on the point cloud data but on the image data, an object including the indication object on the image data is specified by clustering, a point representing the specified object on the point cloud data is acquired, the acquired point is regarded as the indication object, and a route from a current position to an imaging position of the imaging device and an imaging posture are determined as the imaging condition.

9. The imaging condition determination method according to claim 7, wherein in the third step, in a case where the displacement from the current posture to the imaging posture of the imaging device is determined as the imaging condition, a direction vector from a specific position of the reference data to a center of the indication object is calculated, and the displacement from the current posture to the imaging posture of the imaging device is determined based on the direction vector.

10. The imaging condition determination method according to claim 7, wherein in the third step, in a case where the route from the current position to the imaging position of the imaging device and the imaging posture are determined as the imaging condition, an imaging region is calculated, the imaging region being a region in which the target object is not shielded by the object and being capable of being physically imaged, or the imaging region is calculated based on a distance to the indication object or an incident angle, an imaging position is determined in the imaging region based on a positional relationship with the current position of the imaging device, the route from the current position to the imaging position of the imaging device is determined, and the imaging posture is determined based on a direction vector form the imaging position to the indication object.

11. An imaging condition determination system comprising:

at least one memory storing instructions, and at least one processor configured to execute the instructions to;

hold reference data representing a position of an object;

hold an indication object representing a position of a target object on the reference data;

determine an imaging condition of Light Detection And Ranging (LiDAR) for imaging the target object based on the reference data and the indication object; and output the imaging condition, wherein the at least one processor is further configured to execute the instructions to output the imaging condition to an imaging controller configured to acquire the reference data by using an imaging device including only the LiDAR or including the LiDAR and a camera, and the imaging controller changes a state of the imaging device based on the imaging condition.

12. An imaging condition determination device comprising:

at least one memory storing instructions, and at least one processor configured to execute the instructions to;

hold reference data representing a position of an object;

hold an indication object representing a position of a target object on the reference data;

determine an imaging condition of Light Detection And Ranging (LiDAR) for imaging the target object based on the reference data and the indication object; and output the imaging condition, wherein the at least one processor is further configured to execute the instructions to output the imaging condition to an imaging controller configured to acquire the reference data by using an imaging device including only the LiDAR or including the LiDAR and a camera, and the imaging controller changes a state of the imaging device based on the imaging condition.

\* \* \* \* \*